July 29, 1924.

S. R. HOWARD 1,502,724

PACKAGE STOP MECHANISM

Filed Oct. 5 1921

S. R. HOWARD

PACKAGE STOP MECHANISM

Filed Oct. 5, 1921

Inventor
Stanley R. Howard.
By ⟨signature⟩
Attorney

July 29, 1924.
S. R. HOWARD
PACKAGE STOP MECHANISM
Filed Oct. 5 1921
1,502,724
4 Sheets-Sheet 3
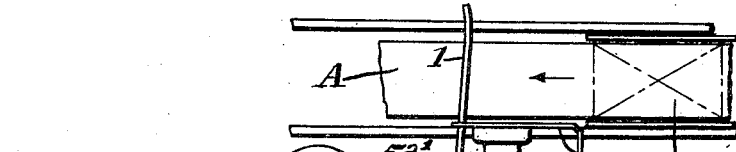
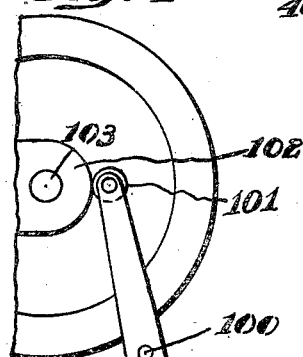
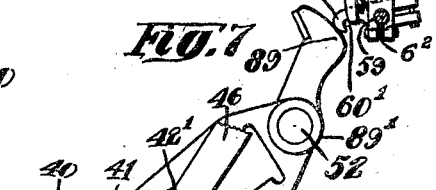
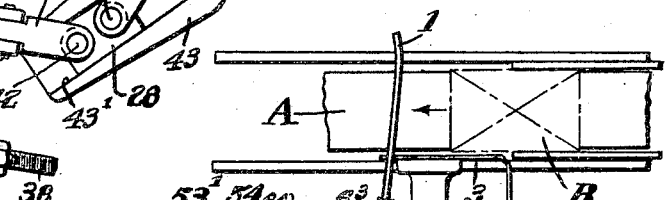
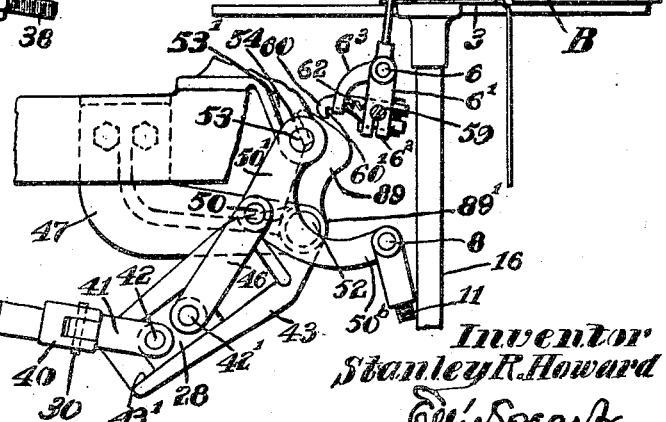
Inventor
Stanley R. Howard
By Ellis Spratt
Attorney July 29, 1924.
S. R. HOWARD
1,502,724
PACKAGE STOP MECHANISM
Filed Oct. 5, 1921
4 Sheets-Sheet 4
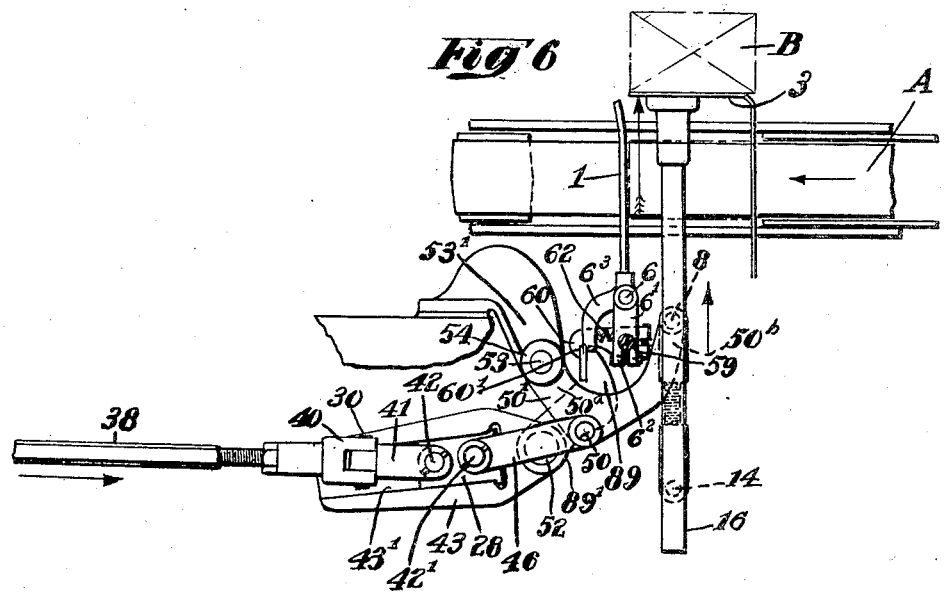
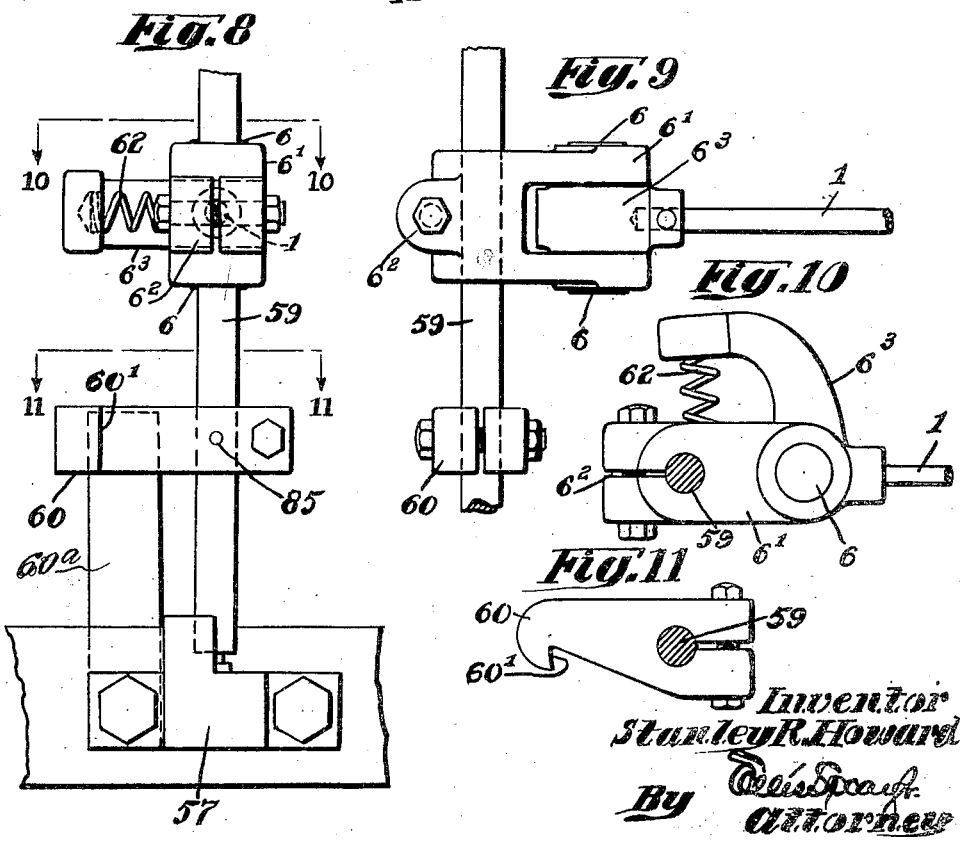
Inventor
Stanley R. Howard
By *Otis Spack Jr.*
Attorney Patented July 29, 1924.

1,502,724

UNITED STATES PATENT OFFICE.

STANLEY R. HOWARD, OF EAST MILTON, MASSACHUSETTS, ASSIGNOR, BY MESNE ASSIGNMENTS, TO STATE STREET TRUST COMPANY, TRUSTEE, A CORPORATION OF MASSACHUSETTS.

PACKAGE STOP MECHANISM.

Application filed October 5, 1921. Serial No. 505,652.

*To all whom it may concern:*

Be it known that I, STANLEY R. HOWARD, a citizen of the United States, residing at East Milton, county of Norfolk, Commonwealth of Massachusetts, have invented certain new and useful Improvements in Package Stop Mechanism, of which the following is a specification.

This invention relates to stop mechanism, and while capable of a variety of uses, is particularly adapted for use upon a carton closing and sealing machine such as shown and described in the patent to William S. Scales, No. 930,090, granted August 31, 1909, to which reference is made as illustrating the particular type of machine involved herein.

The object of the present invention, generally stated, is to improve the stop shown in the Scales patent. More specifically, the present invention aims to provide a stop which will be positive in action and will contain a safety feature whereby jamming of the packages will be avoided.

These objects, together with certain other features of advantage which will appear more fully hereinafter, are secured in the device of the present invention.

The construction and operation of the present invention, together with an embodiment which has been found satisfactory in use, is described and illustrated in the accompanying specification and drawings and the characteristic features of novelty are particularly pointed out in the appended claims.

Throughout the specification and drawings like reference characters are correspondingly employed, and in the drawings:

Fig. 3 is a fragmentary plan detail showing the parts in the position of Fig. 2.

Fig. 4 shows the cam operated lever in its forward position.

Fig. 5 is a fragmentary plan detail showing the position of the parts when the cam lever is in the position of Fig. 4 and prior to the actuation of the feeler finger by the package.

Fig. 6 is a view corresponding to Fig. 5 and showing the position of the parts after the feeler finger has been actuated by the package and package pusher has operated to set over a package from the package receiving belt to the package table of the machine.

Fig. 7 is a fragmentary detail particularly illustrating the action of the safety feature of the stop mechanism.

Fig. 8 is a partial side elevation along the shaft for the feeler finger.

Fig. 9 is a fragmentary view at right angles to Fig. 8, and

Figure 1:
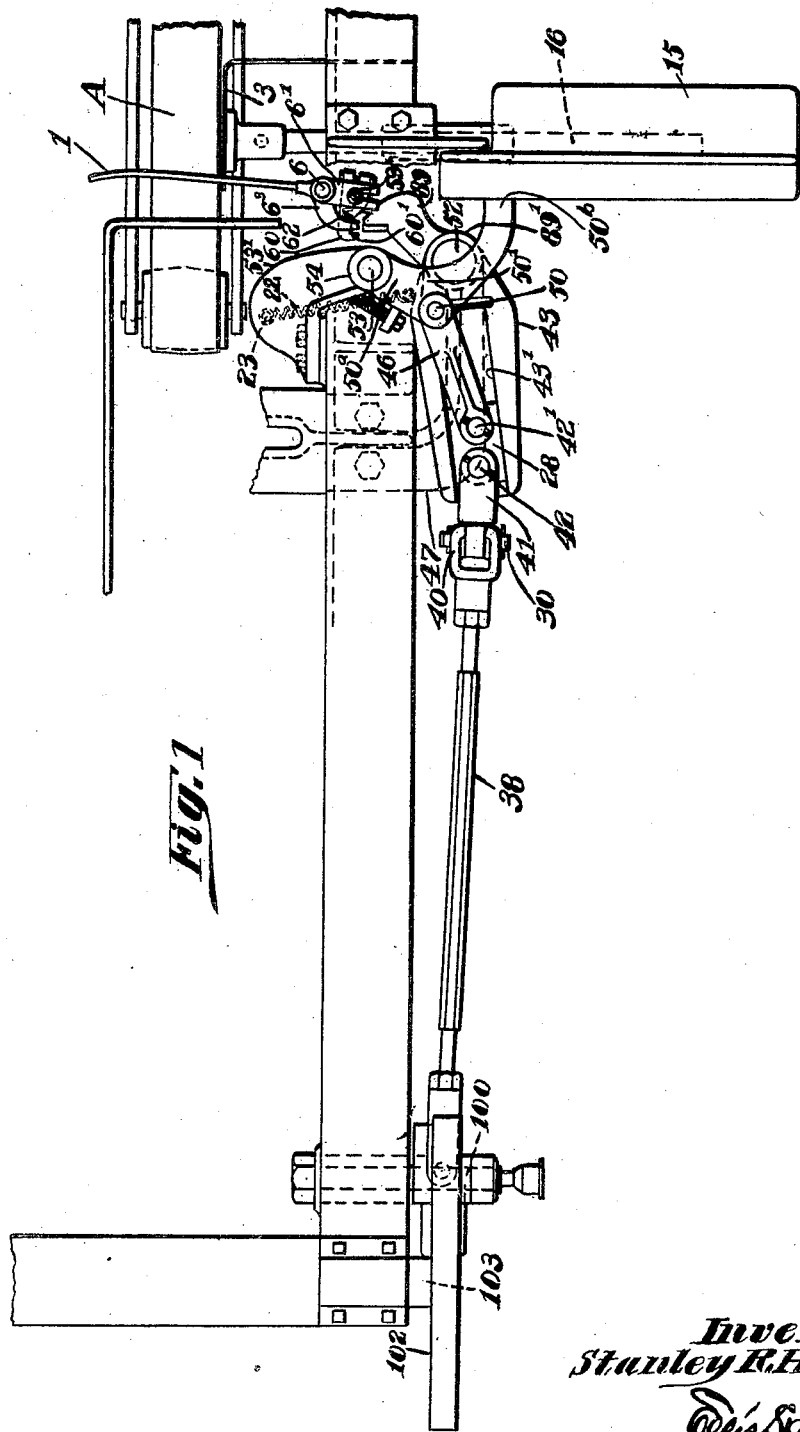
Fig. 1 is a partial plan view of so much of a carton closing and sealing machine equipped with my invention as is necessary to show the combination and relation of parts.

Figs. 10 and 11 are horizontal sections of the lines 10—10 and 11—11 of Fig. 8, respectively.

I have indicated at A the package receiving belt of a carton closing and sealing machine such as illustrated in the Scales patent, referred to hereinbefore. The packages B are adapted to be successively set over from the belt A onto the package table of the machine by a package pusher 3, operating at right angles to said belt A. After such set over, the packages are advanced by suitable package feed mechanism to the closing and sealing mechanism of the machine.

Overlying the belt A and disposed at right angles to the path of travel of the packages moving along said belt is a feeler finger 1 against which the packages are adapted to successively come into abutment for set over onto the package table of the machine by the package pusher 3, the operation of which is controlled by the finger 1.

The finger 1 is fastened in a bracket $6^3$ which is pivotally mounted on a pin 6 (see Figs. 8, 9 and 10) set vertically through a bearing 6' which is adjustably clamped at $6^2$ to a vertical shaft 59, the bearing 6' being slotted to receive the arm of the bracket $6^3$. Between said arm of the bracket $6^3$ and the adjacent face of the clamp 6' a coil spring 62 is confined.

The purpose of the spring 62 is to provide a yielding connection between the feeler finger 1 and the shaft 59 so that the finger may yield forwardly when actuated by a package without imparting rotation to the shaft 59, should the latch mechanism hereinafter described be positioned in such relation as to prevent rotation of the shaft 59.

The vertical shaft 59 is journaled at its lower end in a half-round trunnion 57 which is fastened to the lower side rail of the machine frame and at its upper end has bearing upon a trunnion screw 73 which is adjustable in a bracket 76 fastened to the upper side rail of the machine frame. The actuation of the finger 1 by a package B is transmitted to the shaft 59, turning said shaft through a partial revolution against the action of a coil spring 86 which is anchored at 87 to the lower side rail of the machine frame and at 85 to a stud which projects from a latch piece 60 fast to the shaft 59 and adapted to contact a stop $60^a$ whereby the rotation of said shaft 59 is limited.

The free end of the latch piece 60 is formed as a hook 60' which upon rotation of shaft 59 under the effective actuation of finger 1 by a package is adapted to engage the hooked end of a curved latch stop 89 projecting horizontally from the bearing portion 89' of a slideway-provided arm 43. The bearing 89' is sleeved about a vertically disposed stud 52 which is set in a plate 47 extending from the lower side rail of the machine frame and itself having a bearing portion 47' complemental to the bearing 89'.

When the hook ends of the latch members 60 and 89 are disengaged, the arm 43 is free to swing about the stud 52 as an axis, (see Fig. 5), and the package pusher 3 is not operated. When, however, said hook ends are engaged, (see Fig. 6), the motion of the arm 43 about said stud as an axis is prevented, and through suitable mechanism which will now be described the pusher 3 is operated.

Mounted in the slideway 43' of said arm 43 is a slide block 28 to which a toggle 41 is fastened at 42. The toggle 41 is normally substantially alined with the slideway 43' (see Fig. 3) and fastened at 30 between the forked ends 40 of a connecting rod 38 which is adjustably connected at its opposite end to a cam lever 34 which is pivoted at 100 and has a cam roll 101 adapted to coact with a cam 102 on the cam shaft 103 of the machine.

Fastened at 42' to the block 28 in advance of the stud 42 is a connecting link 46 which is forked and pivoted at 50 to a bell crank lever 50' having a bearing 54 about a vertically disposed shaft 53 which is journaled in suitable bearings 53' projecting from one of the vertical webs connecting the upper and lower side rails of the machine frame.

From bell crank 50' depends an arm $50^a$ to which one end of a coil spring 22 is anchored, the opposite end of said spring being anchored to a stud 23 depending from an extension of one of said bearings 53'.

Pinned at 8 to the outer end $50^b$ of the bell crank 50' is a connecting rod 11 (see Fig. 3). The opposite end of said rod 11 is connected to a pin 14 which is clamped at 78 to a pusher rod 16 which is slidable in a bearing in a guarded way 15 extending horizontally from the frame and is fastened at its inner end to the right-angled shaped package pusher 3.

Figure 2:
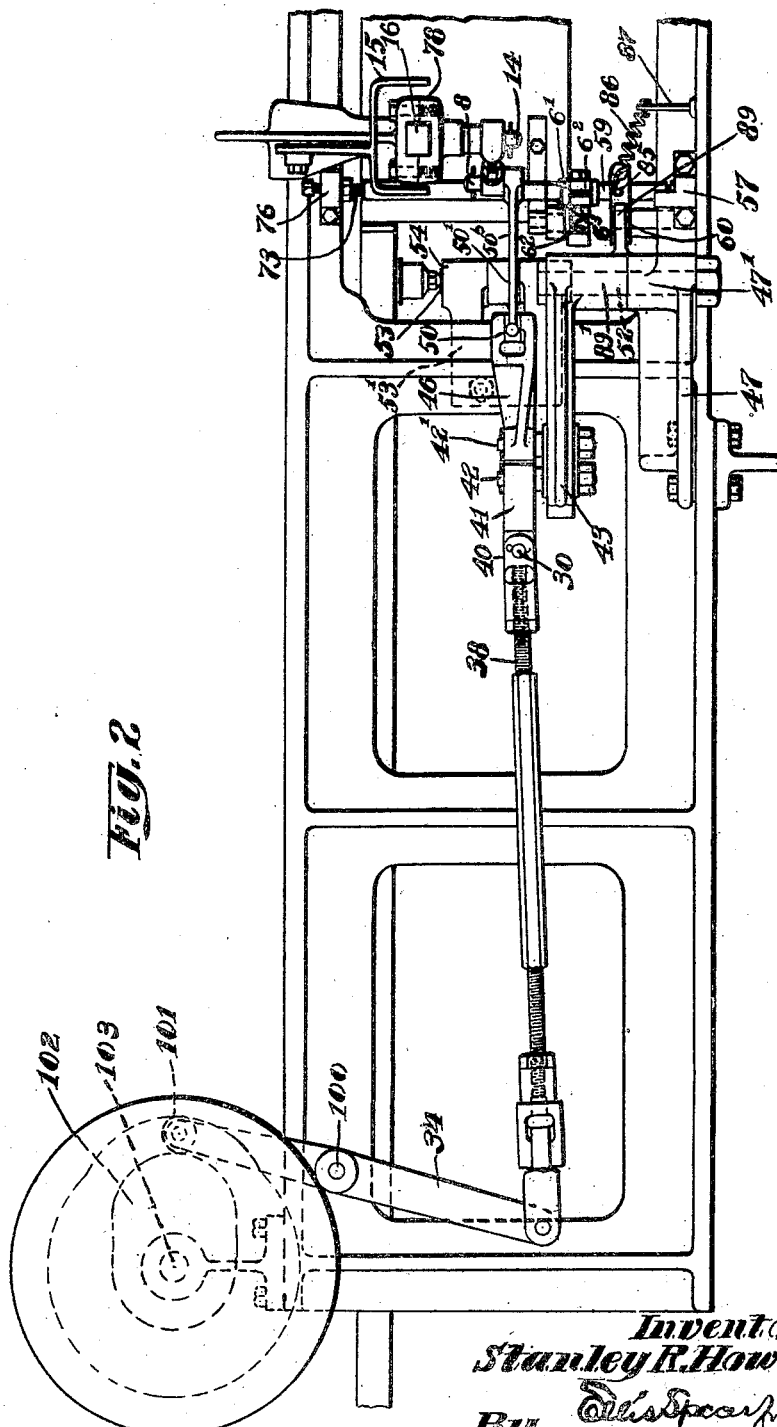
Fig. 2 is a side elevation of Fig. 1.

The operation is as follows:

With the parts in the position in Figs. 1, 2 and 3 and a package B on the belt A at the point indicated at Fig. 3, the finger 1 is not actuated by the package and consequently the throw of the connecting rod 38 is idle or ineffective to actuate the package pusher, since the shaft 59 is not rotated and the hook 60' thereof is not brought into engagement with the latch stop 89. The actuation of the connecting rod 38 swings the slideway arm 43 outwardly on the stud 52, as shown in Fig. 5, and the link 46 pivots on its pin 50 without rocking the bell crank lever to advance the package pusher. When, however, the package contacts the finger 1, as shown in Fig. 6, said finger is thereby rocked upon its pivot and through its connection with the shaft 59 rotates said shaft through a sufficient portion of a revolution to bring the hook 60' thereof into engagement with the latch 89 of the slideway arm 43, thereby preventing said arm from turning on its pivot stud 52 under the actuation of the connecting rod 38. The arm 43 is therefore held in alinement with said rod 38 and the motion of the rod moves the slide block 28 forwardly in the slideway 43', thereby swinging the bell crank lever on its pivot 53 and through the connecting rod 11, reciprocating the package pusher 3 transversely across the package belt, as shown in Fig. 6, to set over the package B onto the package table of the machine.

In the event that the hook end 60' of the latch 60 should be left against the face of the latch 89 in somewhat the position of Fig. 7, thereby preventing the rotation of the shaft 59 upon actuation of the finger 1 by a package, the coil spring 62 for said finger is compressed, allowing the finger to yield until the latch 89 is returned by the return movement of the connecting rod 38 whereupon said spring will be relieved and the shaft 59 will be rotated sufficiently to bring its hook end 60' into engagement with said latch.

While I have shown and described my stop mechanism in connection with a carton closing and sealing machine, it will be understood that such showing is purely illustrative and in no way limiting, and that the principles of my invention may be utilized in a variety of adaptations.

Various modifications in the construction and arrangement of parts may obviously be made within the limits of the appended claims.

What I therefore claim and desire to secure by Letters Patent is:

1. In combination, a toggle, an actuating member therefor, a pivoted guide for the toggle joint alignable with said actuating member, and means for releasably holding said guide in alignment with said actuating member.

2. In combination, a toggle, an actuating member therefor, a pivoted guide for the toggle joint alignable with said actuating member, and means for releasably holding said guide in alignment with said actuating member comprising a latch element carried by said guide, and a latch element movable into latching engagement with said first named latch element.

3. In combination, a toggle, an actuating member therefor, a pivoted guide having a slideway alignable with said actuating member, a slide in said slideway operatively connected with said toggle, and means for releasably holding said guide in alignment with said actuating member, comprising a latch element carried by said guide, and a latch element rotatable into latching engagement with said first-named latch element.

4. In a stop mechanism of the class described, a reciprocating member, an operating lever therefor, a pivoted slideway, a slide in said slideway, an operating rod connected to said slide, and a link connecting said slide and said operating lever out of the line of said operating rod.

5. In a package stop mechanism of the class described, a reciprocating pusher, an operating lever therefor, a pivoted slideway, a slide in said slideway, an operating rod connected to said slide, a link connecting said slide and said operating lever out of the line of said operating rod, and a package operated latch effective to engage the slideway and hold it in alignment with the operating rod.

6. In a package stop mechanism of the class described, a reciprocating package pusher, an operating lever therefor, a pivoted slideway, a slide in said slideway, an operating rod connected to said slide, a link connecting said slide and said operating lever out of the line of said operating rod, a latch element carried by said slideway, and a package operated latch element movable into latching engagement with said first named latch element to hold the slideway in alignment with the operating rod.

7. In a package stop mechanism of the class described, a reciprocating package pusher, a bell crank lever for actuating said pusher, a toggle, a toggle actuating member, a pivoted guide for the toggle joint alignable with said toggle actuating member, a link pivoted to said bell crank lever and operated by said toggles and disposed out of the line of said toggle actuating member, and a package operated mechanism for releasably holding said guide in alignment with said toggle actuating member.

8. In a package stop mechanism of the class described, a reciprocating package pusher, a bell crank lever for actuating said pusher, a toggle, a toggle actuating member, a pivoted slideway for the toggle alignable with said toggle actuating member, a slide in said slideway operatively connected with said toggle, a link pivoted to said bell crank lever and operatively connected with said slide and disposed out of the line of said toggle actuating member, and a package operated mechanism for releasably holding said slideway in alignment with said toggle actuating member.

9. In a package stop mechanism of the class described, a reciprocating package pusher, a bell crank lever for actuating said pusher, a toggle, a toggle actuating member, a pivoted slideway for the toggle joint alignable with said toggle actuating member, a slide in said slideway operatively connected with said toggle, a link pivoted to said bell crank lever and operatively connected with said slide and disposed out of the line of said toggle actuating member, and means for releasably holding said slideway in alignment with said toggle actuating member comprising a latch element carried by said guide, a latch element movable into latching engagement with said first named latching element, and a package actuated member operatively connected with said second named latch element.

10. In a package stop mechanism of the class described, a reciprocating package pusher, a bell crank lever for actuating said pusher, a toggle, a toggle actuating member, a pivoted slideway for the toggle joint alignable with said toggle actuating member, a slide in said slideway operatively connected with said toggle, a link pivoted to said bell crank lever and operatively connected with said slide and disposed out of the line of said toggle actuating member, and means for releasably holding said slideway in alignment with said toggle actuating member comprising a latch element carried by said guide, a latch element rotatable into latching engagement with said first named latching element, a shaft carrying said second named latch element, a package actuated finger mounted on said shaft, and a yielding connection between said finger and shaft permitting said finger to yield in the event that the latch elements are so disposed relatively to each other as to prevent rotation of said shaft when said finger is actuated by a package.

11. In a machine of the class described, a finger adapted to be actuated by a package, a shaft upon which said finger is mounted, a pivoted slideway, a slide in said slideway, a latch carried by said slideway, a latch on said shaft adapted upon rotation of said shaft to engage said latch of the slideway and prevent movement of said slideway about its pivot, a package pusher, a toggle fastened to said slide, means for actuating said toggle, and an operative connection between said slide and said package pusher effective when said latch members are engaged to transmit the actuation of said toggle to the package pusher.

12. In a machine of the class described, a finger adapted to be actuated by a package, a shaft upon which said finger is mounted, a yielding connection between said finger and shaft permitting said finger to yield relative to the shaft should the shaft be accidentally held against rotation when said finger is actuated by a package, a pivoted arm having a slideway and a latch piece, a slide in said slideway, a latch piece on said shaft adapted upon rotation of said shaft to engage said latch piece of the slideway arm and prevent movement of said arm about its pivot, a package pusher operating in a plane transversely to the axis of rotation of said shaft, a toggle fastened to said slide, means for actuating said toggle, and an operative connection between said slide and said package pusher and effective when said latch members are engaged to transmit the actuation of said toggle to said package pusher.

13. In a machine of the class described, a finger adapted to be actuated by a package, a shaft upon which said finger is mounted, a pivoted arm having a slideway and a latch piece, a slide in said slideway, a toggle fastened to said slide, an operating rod for said toggle, a latch piece on said shaft adapted upon rotation of said shaft to engage said latch piece of the slideway arm, and hold said arm in alinement with said toggle, a package pusher, and a bell crank lever operatively connected with said package pusher, and a link fastened to said slide and pivoted to said bell crank lever effective to transmit the actuation of said toggle to the package pusher when said latch members are engaged and ineffective to actuate said package pusher when said latch members are disengaged.

14. In combination, a package-actuated stop, a package pusher, a toggle, a toggle-actuating member, a pivoted guide for the toggle joint releasably held in alignment with said toggle-actuating member, and a latch mechanism automatically applied upon actuation of said stop by a package for releasing said guide to permit effective actuation of said pusher.

15. In combination, a shaft, a package actuated member fast thereon, a package pusher, an actuating mechanism for said pusher having a normally ineffective actuating relation thereto, a latch mechanism controlled by the rotation of said shaft for connecting said pusher for effective actuation by its actuating mechanism, and a yielding connection between said shaft and package actuated member permitting said member to yield relative to said shaft should the latch mechanism be accidentally left in position to prevent rotation of said shaft.

16. In combination, a package actuated stop, a package pusher, pusher actuating mechanism including a constantly driven member, a pivoted guide therefor normally free to be rocked upon its pivot by said member, connections between said member and pusher normally ineffective to transmit the actuation of said member to said pusher when said guide is free to be rocked upon its pivot and transmitting such actuation when said guide is held against pivotal movement, and a latch mechanism controlled by the operation of said package stop for holding said guide against pivotal movement whereby the pusher is actuated.

17. In combination, a package actuated stop, a package pusher, pusher actuating mechanism including a constantly driven member, a pivoted guide therefor normally free to be rocked upon its pivot by said member, a bell crank linked to said member and operatively connected with said pusher and normally ineffective to transmit the actuation of said member to said pusher when said guide is free to be rocked upon its pivot and transmitting such actuation when said guide is held against pivotal movement, and a latch mechanism controlled by the operation of said package stop for holding said guide against pivotal movement whereby the pusher is actuated.

18. In combination, a package actuated stop, a package pusher, pusher actuating mechanism including a constantly driven member, a pivoted guide therefor normally free to be rocked upon its pivot by said member, connections between said member and pusher normally ineffective to transmit the actuation of said member to said pusher when said guide is free to be rocked upon its pivot and transmitting such actuation when said guide is held against pivotal movement, and a latch carried by said guide and a latch engageable with said first named latch upon operation of said package stop for holding said guide against pivotal movement whereby the pusher is actuated.

In testimony whereof I affix my signature in presence of two witnesses.

STANLEY R. HOWARD.

Witnesses:
MABEL A. JOHNSON,
GEORGE A. ROBINSON.